Patented Feb. 14, 1939

2,147,547

UNITED STATES PATENT OFFICE 2,147,547

MINERAL OIL COMPOSITION AND METHOD OF MAKING

Orland M. Reiff and Darwin E. Badertscher, Woodbury, N. J., assignors to Socony-Vacuum Oil Company, Incorporated, New York, N. Y., a corporation of New York No Drawing. Application July 21, 1936, Serial No. 91,673

14 Claims. (Cl. 87—9)

This invention relates primarily to an improvement in oils and particularly to the lowering of the temperature at which a hydrocarbon oil comprising a substantially homogeneous mixture of liquid oils and waxy solids undergoes loss of fluidity. Ordinarily, this is referred to as the reduction of the pour point.

This invention relates specifically to improving pour depressants in effectiveness or heat stability, or both, by treating said pour depressants with an acylating agent.

The acylating agents suitable for the uses of this invention are preferably organic acylating agents, such as the chloride or anhydride of an organic carboxylic acid or the acid itself. The organic acylating agents used in the present invention may vary widely in nature. They may for instance correspond to the following: the monocarboxylic saturated, aliphatic acids having molecular weights as low as acetic acid and as high as montanic such for example as acetic, butyric, capric, palmitic, stearic and montanic, corresponding respectively to the acyl radicals acetyl, butyryl, capryl, palmityl, stearoyl and montanyl; unsaturated aliphatic monobasic acids such as acrylic, corresponding to the acyl radical acrylyl; saturated aliphatic polybasic acids such as succinic, oxalic, adipic, sebacic, etc.; unsaturated aliphatic polybasic acids such as fumaric; substituted mono and polybasic aliphatic acids containing halogen, hydroxyl, amino, or keto groups such as chloracetic acid, tartaric acid, and glycollic acid; aromatic monobasic acids such as benzoic and naphthoic; aromatic polybasic acids such as phthalic; alkylene-substituted aromatic monobasic acids such as cinnamic; aryl-substituted mono and polybasic aliphatic acids with COOH in side chain such as xylic, phenylstearic, naphthylstearic and naphthylpolystearic, etc.; substituted aromatic mono and polybasic acids containing halogen, hydroxyl, amino, alkyl, aryl, aralkyl, keto, nitro or alkoxy in the ring such as chlorbenzoic, salicylic, anthranilic, toluic, phenylbenzoic, nitrobenzoic, anisic and benzoylbenzoic acid; non-benzenoid cyclic mono and polycarboxylic acids such as abietic and camphoric acids and heterocyclic carboxylic acids such as furoic acid. In forming the acid chlorides of the hydroxy and/or amino substituted acids mentioned above it is desirable to first acylate these substituted groups before preparing the corresponding acyl chlorides. Of the above acylating agents those corresponding to benzoic, toluic, etc.; to the dicarboxylic aromatic acids of the class typified by phthalic acid; to acetic, and stearic acids, and to the aliphatic dibasic acids, as adipic, sebacic, and succinic acids yield the better results. In general, preference is for the dibasic acids.

The following types of pour depressants are reacted with acylating agents in accordance with this invention:

1. Pour depressants made by condensing aromatic hydrocarbons, such as benzene, toluene, xylene, naphthalene, anthracene, phenanthrene, fluorene, diphenyl, and the like, with chlorinated aliphatic compounds, such as petrolatum, crystalline petroleum wax, ester wax, or other compound resulting in relatively long aliphatic substituents; i. e., aliphatic compounds of relatively high molecular weight. A greatly improved depressant is obtained as a result of the acylating reaction.

2. Pour depressants made by condensing aromatic hydrocarbons and aliphatic compounds (both as defined above) and then resinifying the product thus obtained by condensation with a resinifying agent. The resinifying agent in general may be any such agent which is capable of resinifying the parent aromatic compound. Examples of suitable resinifying agents are: those that eliminate halogen hydrides in reaction with the above-defined classes of oxyaromatic hydrocarbons, for example halogenated organic compounds such as halogenated aralkyl or aryl hydrocarbons, for example, benzyl chlorides, chlornaphthalene and chloranthracene; those that eliminate water, such as the aldehydes, particularly the aliphatic aldehydes, ketones, alcohols and polyalcohols, for example formaldehyde, acetaldehyde, butyraldehyde, acetone, butyl alcohol, ethylene glycol and glycerol; sulphur reagents, for example, elementary sulphur and sulphur chlorides, such as sulphur monochloride, which form oxyaromatic hydrocarbon resins with fixation of sulphur and elimination of hydrogen sulphide; oxidizing agents which eliminate nuclear hydrogen, for example, oxygen, potassium permanganate, chlorine and ferric chloride. Of the above-named resinifying agents, formaldehyde, butyraldehyde and sulphur monochloride are at present preferred. In this operation, improvement in pour depressing effectiveness will be effected. The acylation of this resinified product with dibasic acid chlorides results in the formation of products of still greater effectiveness.

3. Pour depressants made by condensing aromatic hydrocarbons with a resinifying agent and then condensing the product thus obtained with aliphatic material. (Meaning of terms same as above.) The pour depressing effectiveness of this type of product is improved by acylating with dibasic acid chlorides.

4. Pour depressants made by condensing oxyaromatic compounds of the class of hydroxyaromatic compounds and aromatic ethers with aliphthalic compounds (as defined above) and then condensing the product thus obtained with a resinifying agent (as defined above). Examples of suitable oxyaromatic compounds within the above defined class are: phenol, benzyl phenol, resorcinol, o-hydroxydiphenyl, B-naphthol, p-cresol, hydroquinone, catechol, xylenol, phenyl ethyl phenol, methyl hydroxydiphenyl, ethyl hydroxydiphenyl, guaiacol, the monoethylether of catechol, methyl naphthol, tolyl naphthol, xylyl naphthol, benzyl naphthol, methoxyhydroxy naphthalene, anthrazole, phenyl methyl anthrazole and the like. The product of this resinifying operation has increased pour depressing properties, but does not represent an improvement over the original depressant from the standpoint of heat stability. By acylating these resinified products heat stable depressants are obtained.

5. Pour depressants made by condensing oxyaromatic compounds of the class defined above with a resinifying agent and then condensing the product thus obtained with aliphatic material. (Meaning of terms same as defined above.) In this instance, the acylated product is of improved pour depressing effectiveness and heat stability.

We claim:

1. A mineral oil composition comprising a mixture of liquid mineral oils and waxy hydrocarbons, and having incorporated therein, in small proportion but sufficient to depress the pour point of the oil, the product obtained by condensing an aromatic hydrocarbon with chlorinated aliphatic material of relatively high molecular weight and then reacting the product thus obtained with an acylating agent.

2. A mineral oil composition comprising a mixture of liquid mineral oils and waxy hydrocarbons, and having incorporated therein, in small proportion but sufficient to depress the pour point of the oil, the product obtained by condensing an aromatic hydrocarbon with an aliphatic compound of relatively high molecular weight, then condensing the product thus obtained with a resinifying agent which reacts with aromatic compounds, and then reacting this product with an acylating agent.

3. A mineral oil composition comprising a mixture of liquid mineral oils and waxy hydrocarbons, and having incorporated therein, in small proportion but sufficient to depress the pour point of the oil, the product obtained by condensing an aromatic hydrocarbon with a resinifying agent which reacts with aromatic compounds, then condensing the product thus obtained with an aliphatic compound of relatively high molecular weight, and then reacting this product with an acylating agent.

4. A mineral oil composition comprising a mixture of liquid mineral oils and waxy hydrocarbons, and having incorporated therein, in small proportion but sufficient to depress the pour point of the oil, the product obtained by condensing an oxyaromatic compound selected from the class which consists of the hydroxy aromatic compounds and the aromatic ethers with an aliphatic material of relatively high molecular weight, condensing the product thus obtained with a resinifying agent which reacts with aromatic compounds, and then reacting this product with an acylating agent.

5. A mineral oil composition comprising a mixture of liquid mineral oils and waxy hydrocarbons, and having incorporated therein, in small proportion but sufficient to depress the pour point of the oil, the product obtained by condensing an oxyaromatic compound selected from the class consisting of the hydroxy aromatic compounds and the aromatic ethers with a resinifying agent which reacts with aromatic compounds, condensing the product thus obtained with aliphatic material of relatively high molecular weight, and then reacting this product with an acylating agent.

6. The method of producing a lubricant oil of relatively low pour point which comprises condensing an aromatic hydrocarbon with chlorinated aliphatic material of relatively high molecular weight, then reacting the product thus obtained with an acylating agent, and admixing the reaction product with a mineral lubricant oil of relatively high pour point in small proportion but sufficient to depress the pour point of the said oil.

7. The method of producing a lubricant oil of relatively low pour point which comprises condensing an aromatic hydrocarbon with an aliphatic compound of relatively high molecular weight, then condensing the product thus obtained with a resinifying agent which reacts with aromatic compounds, then reacting this product with an acylating agent, and admixing the reaction product with a mineral lubricant oil of relatively high pour point in small proportion but sufficient to depress the pour point of the said oil.

8. The method of producing a lubricant oil of relatively low pour point which comprises condensing an aromatic hydrocarbon with a resinifying agent which reacts with aromatic compounds, then condensing the product thus obtained with an aliphatic compound of relatively high molecular weight, then reacting this product with an acylating agent, and admixing the reaction product with a mineral lubricant oil of relatively high pour point in small proportion but sufficient to depress the pour point of the said oil.

9. The method of producing a lubricant oil of relatively low pour point which comprises condensing an oxyaromatic compound selected from the class which consists of the hydroxy aromatic compounds and the aromatic ethers with an aliphatic material of relatively high molecular weight, condensing the product thus obtained with a resinifying agent which reacts with aromatic compounds, then reacting this product with an acylating agent, and admixing the reaction product with a mineral lubricant oil of relatively high pour point in small proportion but sufficient to depress the pour point of the said oil.

10. The method of producing a lubricant oil of relatively low pour point which comprises condensing an oxyaromatic compound selected from the class consisting of the hydroxy aromatic compounds and the aromatic ethers with a resinifying agent which reacts with aromatic compounds, condensing the product thus obtained with aliphatic material of relatively high molecular weight, then reacting this product with an acylating agent, and admixing the reaction product with a mineral lubricant oil of relatively high pour point in small proportion but sufficient to depress the pour point of the said oil.

11. A mineral oil composition comprising a mixture of liquid mineral oils and waxy hydrocarbons, and having incorporated therein, in small proportion but sufficient to depress the pour point of the oil, the product obtained by separately condensing an aromatic compound with chlorinated aliphatic material of a relatively high molecular weight and a resinifying agent which reacts with aromatic compounds and finally reacting the product with an acylating agent.

12. The method of producing a mineral lubricant oil of relatively low pour point which comprises separately condensing an aromatic compound with a chlorinated aliphatic material of relatively high molecular weight and a resinifying agent which reacts with aromatic compounds, then reacting this product with an acylating agent, and admixing the reaction product with a mineral lubricant oil of relatively high pour point in small proportions but sufficient to depress the pour point of said oil.

13. A mineral oil composition comprising a mixture of liquid mineral oils and waxy hydrocarbons, and having incorporated therein, in small proportion but sufficient to depress the pour point of the oil, the product obtained by condensing an aromatic compound with chlorinated aliphatic material of relatively high molecular weight and then reacting the product thus obtained with an acylating agent.

14. The method of producing a lubricant oil of relatively low pour point which comprises condensing an aromatic compound with chlorinated aliphatic material of relatively high molecular weight, then reacting the product thus obtained with an acylating agent, and admixing the reaction product with a lubricant oil of relatively high pour point in small proportion but sufficient to depress the pour point of the said oil.

ORLAND M. REIFF.
DARWIN E. BADERTSCHER.